Figure 1:
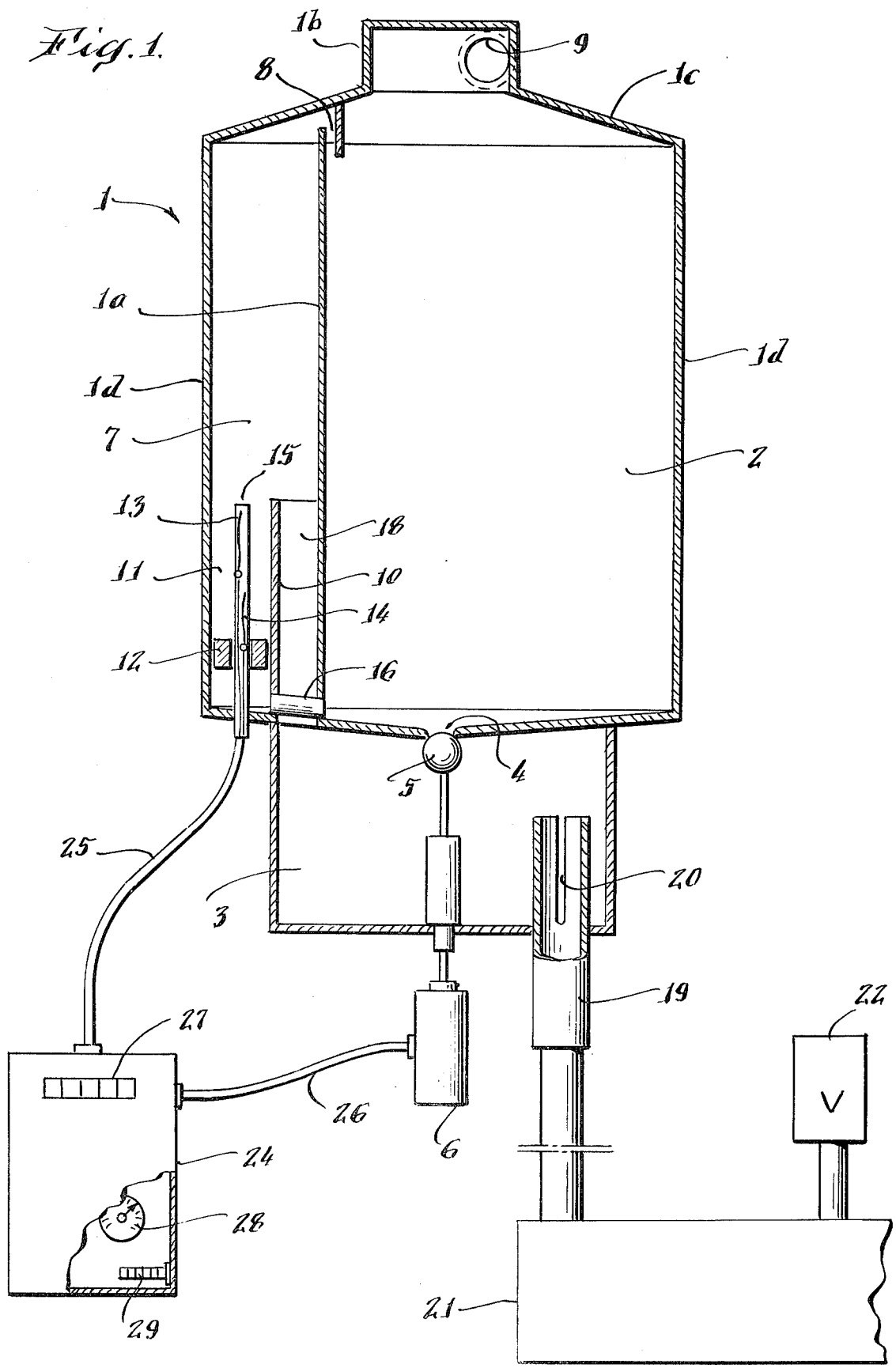

United States Patent [19]

Sutton et al.

[11] Patent Number: 4,485,762

[45] Date of Patent: Dec. 4, 1984

[54] MILK METERING METHOD AN APPARATUS

[75] Inventors: Philip J. Sutton, Ebensburg, Pa.; Byron W. Lyon, Poughkeepsie, N.Y.; Gunnar A. A. Werner, Kansas City, Mo.

[73] Assignee: Alfa-Laval, Inc., Poughkeepsie, N.Y.

[21] Appl. No.: 451,886

[22] Filed: Dec. 21, 1982

[51] Int. Cl.³ .............................................. A01J 9/00
[52] U.S. Cl. ................................ 119/14.17; 119/14.46
[58] Field of Search ................ 119/14.05, 14.17, 14.46

[56] References Cited

U.S. PATENT DOCUMENTS

| | | | |
|---|---|---|---|
| 3,919,975 | 11/1975 | Duncan | 119/14.05 |
| 4,231,324 | 11/1980 | Schletter | 119/14.17 |
| 4,372,249 | 2/1983 | Kiestra et al. | 119/14.17 |

FOREIGN PATENT DOCUMENTS 0041120  12/1981  European Pat. Off. ......... 119/14.17

*Primary Examiner*—Hugh R. Chamblee
*Attorney, Agent, or Firm*—Davis, Hoxie, Faithfull & Hapgood

[57] ABSTRACT

To measure the milk yield of a cow, milk is passed continuously from the milking machine into an upper chamber of a meter while releasing air from the milk; and when the milk rises to a certain high level in the upper chamber, a valve opens to effect gravity flow of milk at a predetermined rate Q from the upper to a lower chamber until the milk descends to a certain low level in the upper chamber, whereupon the valve is closed until the milk again rises to the high level. These steps are repeated until the milk flow from the cow substantially ceases, whereupon the valve opens to effect gravity flow of the milk for the last time to said low level. The total time t occupied by said gravity flows is measured, as is the amount W of milk required to fill the upper chamber to said low level; and the milk yield is calculated by adding the values Qt and W. A vacuum is maintained in the lower chamber to draw air thereto from the upper chamber through an air passage by-passing said gravity flow, and milk and air are withdrawn by suction from the lower chamber.

4 Claims, 2 Drawing Figures

U.S. Patent   Dec. 4, 1984   Sheet 1 of 2   4,485,762

MILK METERING METHOD AN APPARATUS

This invention relates to the metering of milk flows. More particularly, it relates to a novel method and apparatus for measuring the milk yield of cows.

The proper care and feeding of a dairy animal depends to a large extent upon the availability of certain information about that animal. A very useful piece of information is the milk yield of the animal and changes in the yield on a daily basis. This information is also important in determining whether it is economical to continue to keep and maintain the animal. A number of methods have been devised to measure the yield of a dairy animal at a particular milking. These include large containing vessels to collect the milk, which is then hung from a scale, large graduated glass jars in which the milk is collected, and several types of flow through meters.

With the continued development of computer technology and the ever increasing cost and scarcity of reliable farm labor, as well as the trend toward increased levels of dairy farm automation, there is need for a better device for in-line measurement of milk yields. Such a device must be accurate, compact, reliable and durable. It must also be capable of being cleaned in place and of passing data to an on-farm computer. A further requirement is that it does not increase the fluctuations of the vacuum level in the claw piece of the conventional milking machine with which it is used.

The principal object of the present invention is to provide a method and apparatus which meet the above-noted requirements.

According to the preferred practice of the invention, milk from the cow is fed continuously via the milking machine to an upper chamber while releasing air from the milk accumulating in said chamber. When the milk rises to a predetermined high level, it flows by gravity into a lower chamber through an orifice at a predetermined rate Q which is higher than the feed rate into the upper chamber. When the milk level then descends to a predetermined low level in the upper chamber, said gravity flow is stopped by closing said orifice. Such starting and stopping of the gravity flow is repeated until substantial cessation of the feed into the upper chamber.

During the above-described operations, a vacuum is maintained in the lower chamber to withdraw released air from the upper chamber through a separate air flow passage into the lower chamber. The withdrawn air and the milk from the upper chamber are discharged from the lower chamber through duct means connected to a vacuum source.

The cow's yield of milk is measured quite closely by determining the total time t occupied by the series of gravity flows, determining the amount W of milk required to fill the upper chamber to said low level, and adding W to the product of the flow rate Q and total time t.

Because of the vacuum and the air flow passage, the pressure at the free surface of the milk in the upper chamber and the pressure in the lower chamber are essentially equal. This contributes to maintaining a substantially constant flow rate Q of the milk through the aforesaid orifice, thereby enhancing the accuracy of the yield measurement.

In a preferred form of the new meter, the milk inlet thereto is arranged to direct the milk tangentially into the upper portion of the upper chamber so that the milk flow spirals downward along the side wall of the chamber. This cyclone action facilitates separation of air from the milk, the separated air discharging downwardly through the air passage to the lower chamber under vacuum. Also, the meter preferably includes a subchamber communicating at its lower portion with the lower portion of the upper chamber, and the subchamber contains means for sensing the aforementioned high and low levels, such sensing means being operatively connected to an actuator for a valve which opens and closes said orifice.

Figure 2:
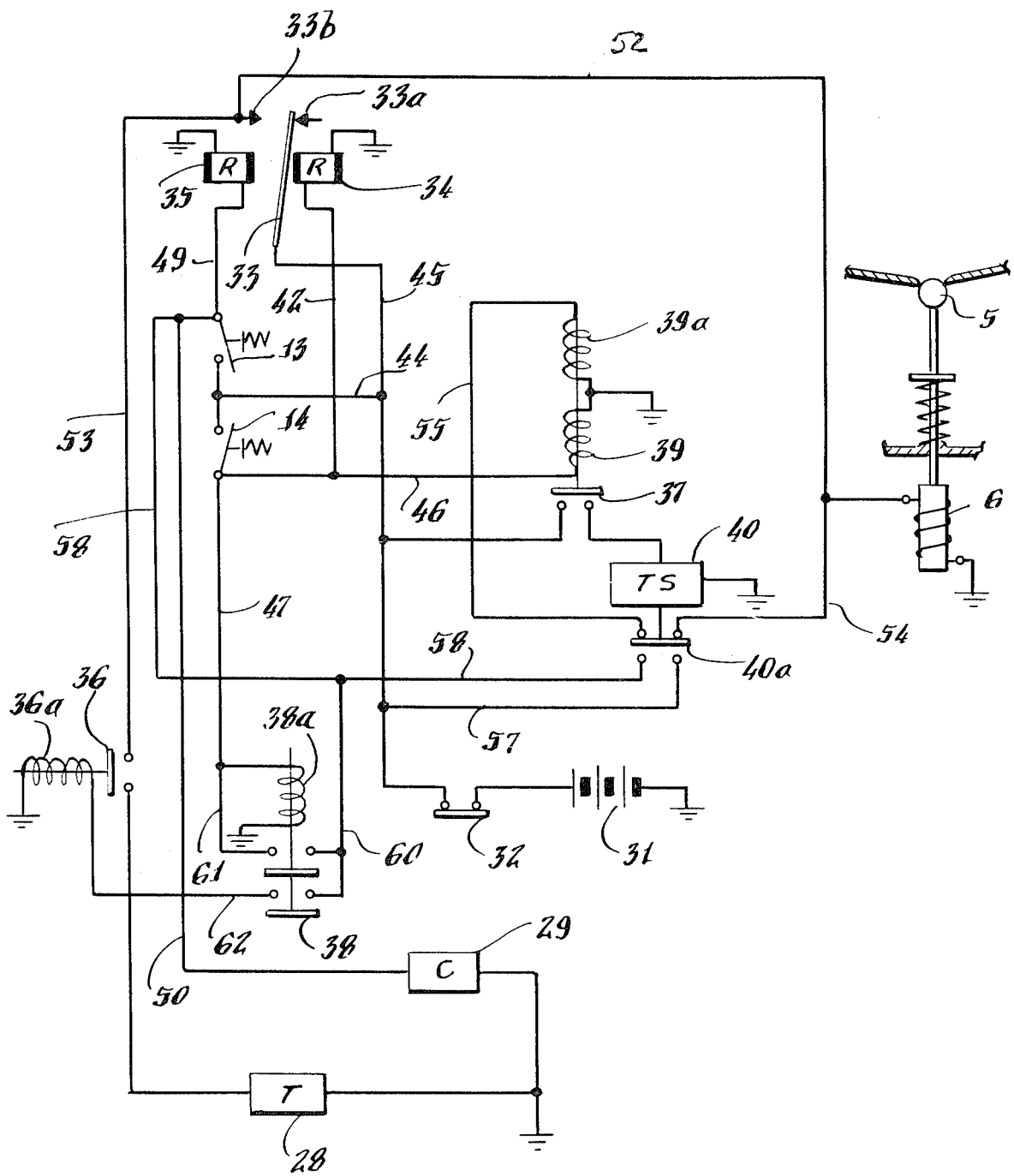

For a more complete understanding of the invention, reference may be had to the following detailed description in conjuction with the accompanying drawings, in which FIG. 1 is a schematic elevational view of a preferred form of the new flow meter, and FIG. 2 is a wiring diagram of an electrical system for operating the flow meter.

As illustrated in FIG. 1, the metering device comprises a housing 1 forming an upper or metering chamber 2 and a lower or mixing chamber 3. These chambers are interconnected through a restricted orifice 4 in the bottom of chamber 2. Orifice 4 can be opened and closed by a valve 5 operated by an actuator 6, such as a solenoid.

A partition 1a in the housing divides metering chamber 1 from a sub-chamber 7 which at its upper portion communicates through opening 8 with the chamber 2. The latter is provided with an inlet 9 through which the milk is introduced tangentially into a dome 1b forming the upper end of chamber 2. From dome 1b, a shoulder 1c of the housing slopes downward and outward to the housing's outer wall 1d.

Sub-chamber 7 is provided with a partition 10 which forms with the housing outer wall 1d a float chamber 11. Within chamber 11 is a float 12 containing a permanent magnet. The latter coacts with an upper reed switch 13 and a lower reed switch 14 supported in a fixed vertical tube 15. At their bottoms, float chamber 11 and metering chamber 2 communicate with each other through a passage 16.

The partitions 1a and 10 form between them an air bypass passage 18 leading downward from sub-chamber 7 into mixing chamber 3. The latter is provided with an outlet tube 19, one end portion of which projects upwardly into chamber 3. A slot 20 in this tube extends from the lower limit of chamber 3 to the open upper end of the tube. At its lower end, tube 19 is connected to a milk receiver 21, such as a tank or transfer line, and the receiver 21 in turn is connected to a vacuum source 22. Thus, air and any other gases released from the incoming milk is sucked from the upper part of metering chamber 2 through opening 8 and thence downwardly through sub-chamber 7, air passage 18, mixing chamber 3 and tube 19 to the vacuum source 22 via receiver 21.

A control 24 receives status information from upper and lower reed switches 13–14 through electrical connection 25 and thereby operates through another electrical connection 26 and actuator 6 to control the position of valve 5. The control 24 includes a display 27 for showing the yield which the meter measures, a timer 28, a counter 29 and a logic system (not shown).

In operation, a non-homogeneous mixture of air and milk is delivered from the milking apparatus (not shown) to the tangential inlet a. From the latter, the milk enters metering chamber 2 tangentially with some velocity and therefore some hydraulic energy. Accordingly, the milk will spiral around the inner wall of dome portion 1b; and when it reaches the transition 1c to the larger diameter at 1d, it will stay on the surface due to centrifugal force. Thus, the milk will lose energy so that when it reaches the bottom of chamber 2, it will have very little remaining hydraulic energy.

Shut-off valve 5 is initially closed due to upper reed switch 13 being in its inactivated position. When the milk level starts to rise, milk enters floats chamber 11 through passage 16, causing float 12 to rise with the milk level. As milk enters the bottom of float chamber 11, very few oscillations and disturbances and very little foam are transmitted into the float chamber. This enables the liquid level to be accurately detected.

The air which enters through inlet 9 with the milk passes through opening 8 into common chamber 7, through air bypass passage 18, into mixing chamber 3, and out through the outlet tube 19. This insures that the pressure at the free surface of the milk in chambers 2 and 7 and the pressure in the mixing chamber 3 are equal.

When the control 24 determines that the milk level has reached the upper reed switch 13, it causes the valve actuator 6 to open the valve 5, starts the timer 28 and increases the count on the counter 29 by one. Since valve 5 is now open, milk drains through orifice 4 into the mixing chamber 3 and out the outlet tube 19. The orifice 4 is of such a size that the flow rate through it will always be greater than the flow rate of milk into the meter, so that the level of the milk will decrease when the valve 5 is open. When the control 24 determines that the level of the milk has reached the lower reed switch 14, it causes valve actuator 6 to close the valve 5 and stops the timer 28. The milk level again begins to rise until it reaches the upper reed switch 13, at which time the control 24 again causes valve actuator 6 to open the valve 5, starts the timer 28, and increases the count on the counter 29 by one. This cycle is repeated as long as milk continues to enter the meter. When the incoming flow of milk has substantially stopped, the control 24 once more causes actuator 6 to open the valve 5, starts the timer 28 and increases the count on the counter 29 by one. When the control again determines that the level of milk has decreased to the lower sensing electrode 14, it stops the timer 28 and begins a time delay. After the time delay, it is assumed that all of the milk in the meter chamber has drained through the orifice 4 into the mixing chamber 3 and out the outlet tube 19. The control 24 then causes the actuator 6 to close the valve 5 in preparation for milking the next dairy animal.

Since the level of the milk in float chamber 11 during the metering process varies only within the limits set by the reed switches 13 and 14, and since even this variation is in a substantially consistent pattern, and since the air by-pass passage 18 keeps the pressure at the free surface of the milk in the meter chamber 2 and the pressure in the mixing chamber 3 equal, and since the density of the milk in the float chamber stays fairly constant and close to 1000 kg/m$^3$, the average hydraulic head of the milk at the orifice 4 can be considered to be constant. As long as the average hydraulic head is substantially constant and the viscosity of the milk is substantially constant, and the density of the milk in the bottom of the meter chamber 2 stays constant and close to 1000 kg/m$^3$, the mass flow rate of milk through the orifice 4 is substantially constant. The amount of milk flowing through the orifice 4 can then be calculated by multiplying the calibrated flow rate by the time that the valve 5 is opened, as determined by the timer 28. However, an error is introduced every time the valve 5 opens and closes. This is due to inertia in the milk, the time response of the valve actuator 6 to a signal from the control 24, the time response of the timer 28 to a signal from the control 24, and perhaps other factors. This error is quite consistent, so that the total error can be calculated by multiplying the number of times the valve opened, as determined by the counter 29, by a calibrated error factor.

The total yield of the dairy animal can be calculated as follows:

$$Y = Qt + EN + W_t$$

where:
Y = Yield in lbs. p1 Q = Flow rate through the orifice 4 in lbs/min. determined by calibration.
t = The time the valve 5 was open in minutes as measured by timer 28.
E = Error factor in lbs. determined by calibration.
N = Number of times the valve 5 opened, dimensionless as counted by counter 29.
$W_t$ = Tare weight, or weight of milk required to fill the meter chamber 2 to the lower sensing electrode 14 in lbs.

The yield is calculated by the control 24 and displayed on the display 27. The size of the orifice 4 must be large enough that the flow rate through it is larger than the flow rate of milk extracted from the fastest milking dairy animal that is likely to be encountered. Such a flow rate, if allowed to pass through a standard-size milk conveying hose such as would normally be connected to the outlet 19, would cause a substantial pressure drop. This, in turn, would cause a substantial drop in the vacuum in the milking apparatus, which is undesirable. The slot 20 in the outlet tube 19 prevents this by integrating the flow. When the valve 5 first opens and the milk begins to enter the mixing chamber 3, the level of milk in the mixing chamber is low and the flow rate through the slot 20 is low. As the level of milk increases, the flow rate increases. When the valve 5 closes, the level of milk in the mixing chamber 3 begins to drop and the flow rate through the slot 20 begins to drop. The milk flowing through the slot 20 is also being continuously mixed with the air entering the top of the outlet tube 19, thereby preventing the milk transfer hose from becoming completely full of milk, and thus limiting the pressure drop.

It will be observed that partition 10 extends above the level of upper reed switch 13, thereby preventing milk from entering mixing chamber 3 by way of the air passage 18.

As previously mentioned, when the incoming flow of milk has substantially stopped, valve 5 is opened and remains open for a sufficient time delay to drain the metering chamber 2. Substantial stopping of the milk flow can be assumed to occur when it is determined that a predetermined time interval has elapsed after a closing of valve 5 without a subsequent opening thereof.

Referring to FIG. 2, the system there shown comprises a current source 31, a manually operated master switch 32, a relay-operated switch 33, solenoid-operated switches 36, 37 and 38, and an electrically operated timer switch 40. Switch 33 engages contact 33a when relay 34 is energized, and it cannot move to engage contact 33b until relay 34 is deenergized and relay 35 is energized. It then remains against contact 33b until relay 35 is deenergized and relay 34 is reenergized.

Switch 36 is normally closed but is held in its open position when its solenoid is energized. Switch 37 closes when solenoid 39 is energized (with solenoid 39a deenergized) and opens when solenoid 39a is energized (with solenoid 39 deenergized). The switch element 40a of timer switch 40 normally bridges its two upper contacts; and it moves downward to bridge its two lower contacts only when a predetermined time interval has elapsed after energizing the timer element of the switch by closing of switch 37. If switch 37 reopens before this time interval has elapsed, the timer elements of switch 40 automatically resets to its starting position.

When master switch 32 is closed to prepare for the metering operation, chamber 2 is empty, reed switches 13 and 14 are open, switch 33 is in its right-hand position engaging stop 33a, switches 36, 37 and 38 are open, and timer switch 40-40a is in its upper position. Also, solenoid 6 is deenergized so that valve 5 is in its normally closed position. As milk enters metering chamber 2, the rising milk level causes the lower reed switch 14 to close, thereby energizing relay 34 through wires 42, 44 and 45. At the same time, solenoid 39 is energized through wires 45-46, thereby closing switch 37 and starting timer switch 40. Also, solenoid 38a is now energized through wire 47, thereby closing the double-pole switch 38. However, such closing has no effect because timer switch element 40a is in its normally raised position.

As the milk level continues to rise, the lower reed switch 14 re-opens; and although relay 34 and solenoid 39 are now deenergized, switch 33 remains against stop 33a, and switch 37 remains closed so as to continue the timing of switch 40. Also, solenoid 38a is now deenergized to re-open switch 38.

When the milk level rises enough to close upper reed switch 13, relay 35 is energized through wires 44 and 49, and counter 29 is energized through wire 50 to increase the count by one. With relay 35 energized, switch 33 is now held against its contact 33b, thereby energizing solenoid 6 through wire 52 to open valve 5, and energizing timer 28 through wire 53 and switch 36. At the same time, solenoid 39a is energized through wire 54, the bridged upper contacts of timer switch 40, and wire 55, thereby reopening switch 37 and resetting the timer element of switch 40 to its starting position.

With valve 5 now open, the milk level begins to fall so as to re-open the upper reed switch 13, thereby deenergizing relay 35. However, switch 33 remains against contact 33b so as to keep valve 5 open and keep timer 28 operating.

When the milk level drops enough to re-close the lower reed switch 14, solenoid 34 is again energized to shift switch 33 against its stop 33a, thereby deenergizing solenoid 6 to close valve 5, and stopping the timer 28. At the same time, solenoid 38a is again energized to re-close switch 38, but again with no effect due to timer switch element 40a being in its upper position.

The milk level in chamber 2 will now begin to rise again, and the above-described sequence of operations will be repeated.

Near the end of the milking, the rate at which milk enters chamber 2 from inlet 9 decreases to the point where closing of upper reed switch 13 does not occur soon enough to prevent timer switch 40 from operating its switch element 40a. It then disengages its upper contacts and bridges its lower contacts, thereby energizing solenoid 35 through wires 57-58 and 49 and energizing counter 29 through wire 50. As a result, the count is again increased by one and switch 33 re-engages contact 33b to open valve 5 and energize timer 28.

When the milk level now drops enough to close lower reed switch 14, the resulting energizing of relay 34 cannot shift switch 33 away from contact 33b because relay 35 remains energized through the lower contacts of timerswitch 40. Thus, valve 5 remains open to allow draining of chamber 2. However, when closing of reed switch 14 re-energizes solenoid 38a, a holding circuit is now established from wire 58 through wire 60, the upper contacts of switch 38, wire 61 and solenoid 38a, so that the latter remains energized after reed switch 14 re-opens as the milk level continues to drop. With switch 38 thus held in its raised position, it energizes solenoid 36a through its lower contacts and wire 62, thereby holding switch 36 in its open position to prevent further operation of timer 28. Consequently, timer 28 will show only the total elapsed time during the repeated intervals between closing of upper reed switch 13 and closing of lower reed switch 14.

When the milking operation has terminated and the flow meter has completely drained, master switch 32 is opened so that all of the relays and solenoids will be deenergized. Valve 5 then closes, and switches 36 and 38 return to their initial positions. To prepare for another milking, timer 28 and counter 29 are reset to their "zero" positions; and switches 33 and 40 are reset to their initial positions. If desired, these resetting steps may be performed automatically by means (not shown) responsive to opening of master switch 32.

While one form of control circuit is shown in FIG. 2, it may take other forms. For example, a microcomputer could be used to perform the monitor and control function; and the software would control the specific implementation.

We claim:

1. In a milk flow meter, the combination of housing means forming a pair of closed chambers, one of said chambers being an upper metering chamber and the other being a lower mixing chamber, said upper chamber having at its upper portion an inlet for receiving milk from a milking apparatus, said chambers being interconnected through an orifice dimensioned to allow gravity flow of milk from the upper to the lower chamber at a rate greater than the maximum flow rate of milk through said inlet, means forming an air flow passage independent of said orifice and leading from the upper portion of the upper chamber into said lower chamber, said housing means also forming a float chamber adapted to receive milk from the upper chamber only through a supply passage leading from the lower portion of the upper chamber to the lower portion of the float chamber, vacuum duct means communicating with said lower chamber for withdrawing both air and milk therefrom, a valve having a normally closed position for stopping flow through the orifice and an open position for allowing flow therethrough, an actuator connected to the valve, and control means operable through said actuator for moving the valve to said open position in response to the milk rising to a predetermined high level in the upper chamber and for moving the valve to said closed position in response to the milk descending to a predetermined low level in the upper chamber, said control means including first and second switches located at said high and low level, respectively, and a float movable in said float chamber to operate said switches.

2. The combination of claim 1, in which said float chamber opens at its upper end into said air flow passage.

3. The combination of claim 2, in which said housing means include a partition separating the float chamber from part of said air flow passage, said supply passage extending through the lower portion of said partition.

4. In a milk flow meter, the combination of housing means forming a pair of closed chambers, one of said chambers being an upper metering chamber and the other being a lower mixing chamber, said upper chamber having at it supper portion an inlet for receiving milk from a milking apparatus, said chambers being interconnected through an orifice dimensioned to allow gravity flow of milk from the upper to the lower chamber at a rate greater than the maximum flow rate of milk through said inlet, means forming an air flow passage independent of said orifice and leading from the upper portion of the upper chamber into said lower chamber, vacuum duct means communicating with said lower chamber for withdrawing both air and milk therefrom, a valve having a normally closed position for stopping flow through the orifice and an open position for allowing flow therethrough, an actuator connected to the valve, an upper switch operable in response to the milk rising to a predetermined high level in the upper chamber, a lower switch operable in response to the milk descending to a predetermined low level in the upper chamber, a timer, a counter, first control means responsive to operation of said upper switch for opening said valve, starting the timer and actuating the counter to increase the count by one, second control means responsive to operation of said lower switch for closing said valve and stopping the timer, and auxiliary switching means operable in response to elapse of a predetemined time interval starting with a closing of said valve and ending before a subsequent opening of said valve, together with means responsive to operation of said auxiliary switching means for opening the valve, starting the timer and actuating the counter and for stopping the timer upon subsequent operation of said lower switch while holding the valve open as the milk level continues to descend below said low level.

* * * * *

UNITED STATES PATENT AND TRADEMARK OFFICE
CERTIFICATE OF CORRECTION

PATENT NO. : 4,485,762

DATED : DECEMBER 4, 1984

INVENTOR(S) : PHILIP J. SUTTON, BYRON W. LYON & GUNNAR A.A. WERNER

It is certified that error appears in the above—identified patent and that said Letters Patent is hereby corrected as shown below:

Col. 2, line 66, change "tangential inlet a" to
--tangential inlet 9--

Col. 3, line 9, change "enters floats chamber 11" to
--enters float chamber 11--

Col. 4, line 17, change "Y = Yield in lbs. pl" to
--Y = Yield in lbs.--

Col. 6, line 68, change "high and low level" to
--high and low levels--

Col. 7, line 14, change "at it supper portion" to
--at its upper portion--

Signed and Sealed this

Fifteenth Day of October 1985

[SEAL]

Attest:

Attesting Officer

DONALD J. QUIGG

Commissioner of Patents and
Trademarks—Designate